C. L. COOK.
BOILER.
APPLICATION FILED APR. 17, 1919.
1,355,125.
Patented Oct. 12, 1920.
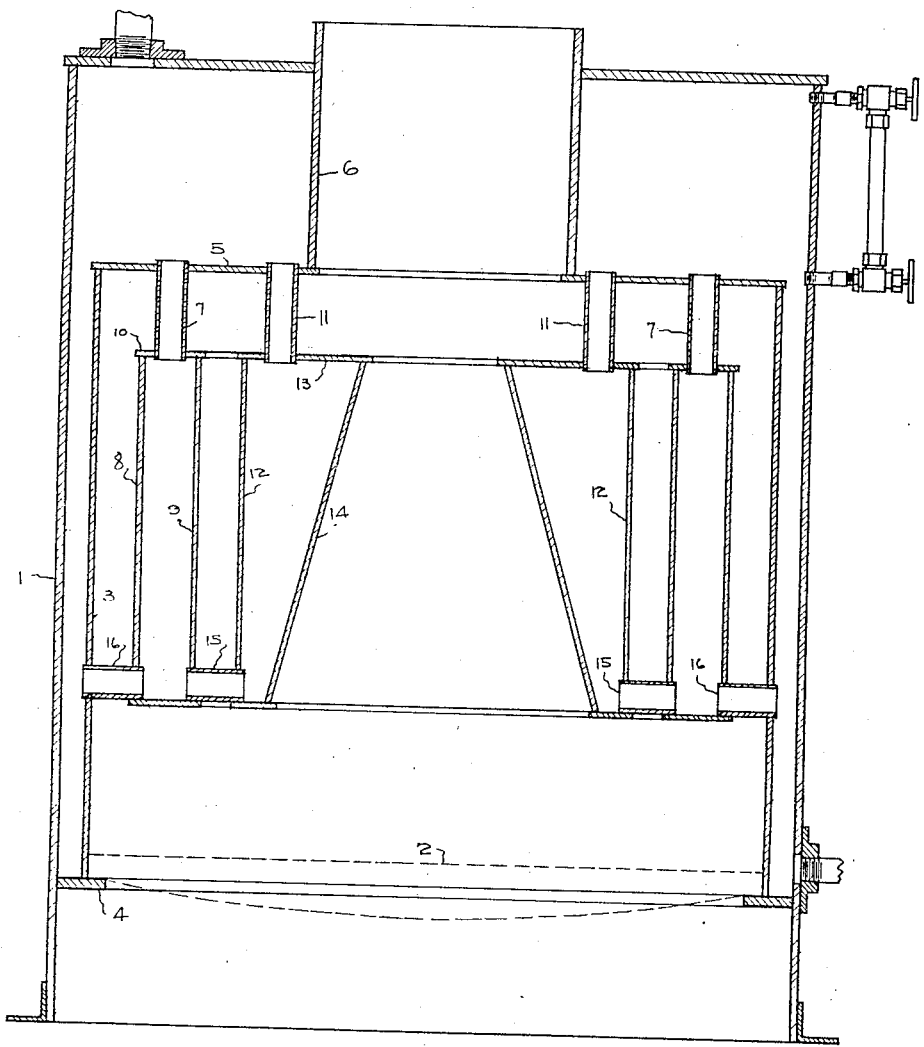
CHARLES LEE COOK
INVENTOR
By: Bradford Webster
ATTORNEY

UNITED STATES PATENT OFFICE.

CHARLES LEE COOK, OF LOUISVILLE, KENTUCKY.

BOILER.

1,355,125.  Specification of Letters Patent.  Patented Oct. 12, 1920.

Application filed April 17, 1919. Serial No. 290,725.

*To all whom it may concern:*

Be it known that I, CHARLES LEE COOK, a citizen of the United States, residing at Louisville, Jefferson county, Kentucky, have invented certain Improvements in Boilers, of which the following is a specification.

My invention relates particularly to boilers used for heating. It has for its object to increase the efficiency of such boilers.

The view in the drawings, part hereof, is a vertical cross section of a boiler embodying my invention.

The usual grate 2 is placed above the firebox in the usual outer shell 1. The mud ring 4 supports the inner shell 3, whose diameter is somewhat less than the diameter of the outer shell 1, providing an annular cylindrical container for water between shells 1 and 3. Said annular container opens at the top into the main body of water and steam in the upper portion of the boiler. Said shell 3 supports the plate 5, which separates the fire gases from the main upper body of water. Preferably in the central portion of said plate is the flue 6.

Inside said shell 3 I place one or more preferably annular water containers, each directly suspended from the plate 5 by a plurality of outlet connecting pipes 7 and 11, preferably welded to the plate 5 and respectively to the top annular plates 10 and 13 of said inner containers.

I prefer to make all intermediate containers of a pair of cylindrical shells 8 and 9. The most central water container I prefer to make of an outer cylindrical shell 12 and an inner conical shell 14. This inmost conical shell 14 retards the passage of the fire gases up the central axis of the boiler, thus causing their more equal distribution over all other surfaces of said containers.

Water inlet connections are provided, preferably in the lower portions, from the main outer body of water in series to the inner containers by the pipes 15 and 16.

The average thickness horizontally of each container I prefer to increase in series from the outside one toward the center, to make the amount of water to be heated as near proportionate as possible to the amount of fire surface and the varying effectiveness of the fire gases and the varying quantity of fire gases on each.

By connecting the inlet means in series and the outlet means directly from each inner container to the main outer body, I provide an automatic system for making the outward flow of heated fluid from each inversely proportional to any variation in the application of the fire gases to the surfaces to be heated. If more heat is applied to the intermediate container and less to the central one, the outflow from the intermediate one is quickened, and the inflow and consequent outflow from the central one are thereby retarded, causing what outflow there is under such conditions from the central one to consist of water and steam more nearly approximating the temperature of such outflow under normal conditions. The same general operation occurs vice versa when more heat is applied to the central container and less to the intermediate one.

I do not limit myself further than is indicated in the claim which follows.

I claim:

A boiler comprising a cylindrical outer shell; a cylindrical shell adjacent thereto, effecting a water chamber therewith and provided with a plate cap and a flue set therein; a cylindrical hollow water container within said inner shell, connected therewith in its lower portion and suspended from its cap plate by connecting pipes, and a central water container, cylindrical on its outer surface and conical on its inner surface, connected with said next adjacent cylindrical container and connected with and suspended from said cover plate of the outermost water container; said flue being placed axially with the axis of said inner container and being of larger diameter than the inside upper diameter of said inner container.

CHARLES LEE COOK.

Witnesses:
JOSEPH A. SCHNEIDER,
ROBERT EASON.